Aug. 2, 1960 J. L. BUIE 2,947,863

LINEAR DISCRIMINATORS OR THE LIKE

Filed March 17, 1954

JAMES L. BUIE
*INVENTOR.*

BY Bruce L. Birchard

HIS ATTORNEY

United States Patent Office 2,947,863

Patented Aug. 2, 1960

2,947,863

LINEAR DISCRIMINATORS OR THE LIKE

James L. Buie, Sun Valley, Calif., assignor to Hoffman Electronics Corporation, a corporation of California Filed Mar. 17, 1954, Ser. No. 416,912

1 Claim. (Cl. 250—27)

This invention is related to discriminator circuits employed in electronic apparatus and more particularly to an improved discriminator which will exhibit a wide linear response characteristic.

In the past, many attempts have been made to design a satisfactory discriminator circuit for employment in electronic equipment. Invariably, certain problems are encountered which render discriminator circuits presently in use deficient in some respects. The principal difficulty lies in the fact that conventional discriminators exhibit a voltage-frequency response characteristic which tends toward non-linearity in the upper and lower response regions. Such rounding off of the response curve tends to produce distortion, and impedes optimum discriminator performance.

Therefore, it is an object of this invention to provide an improved discriminator circuit for employment in electronic apparatus.

It is a further object of this invention to provide an improved discriminator circuit which will exhibit optimum reliability over a wide response region.

According to this invention, the discriminator principally consists of a saturable transformer having a core exhibiting a rectangular hysteresis loop characteristic, a full-wave rectifier having a potentiometer as a center-frequency adjustment, and a low-pass filter. The properties of the above-mentioned transformer are such as to provide an output average voltage which is directly proportional to the frequency of the input signal. This time integration of the signal voltage is produced by virtue of the transformer core material.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings, in which:

Figure 1:
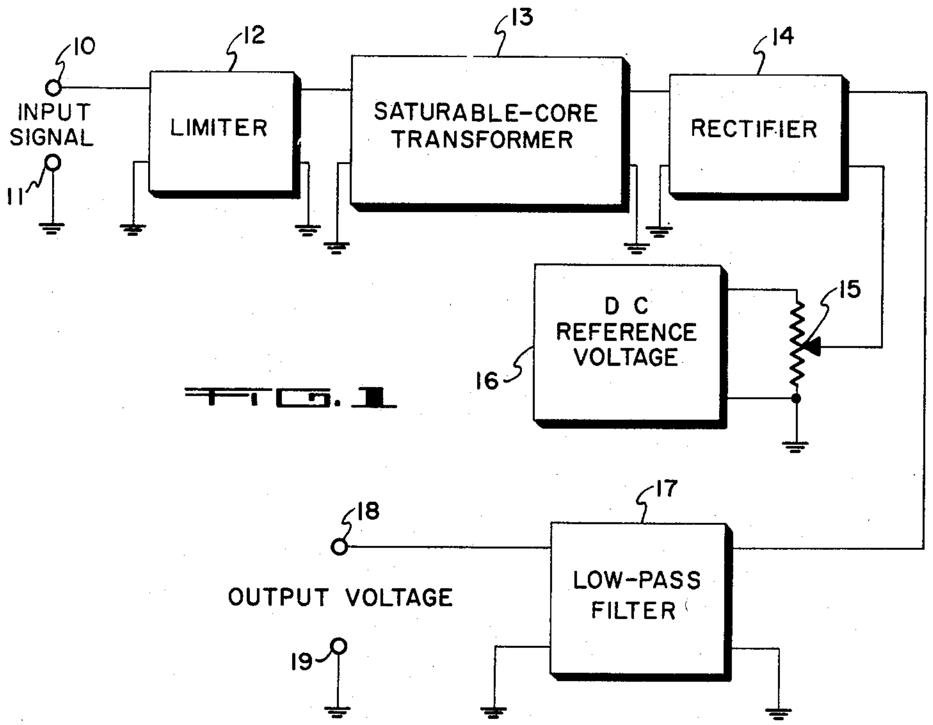
Figure 1 is a schematic diagram of a discriminator circuit according to this invention.
Figures 2, 3:
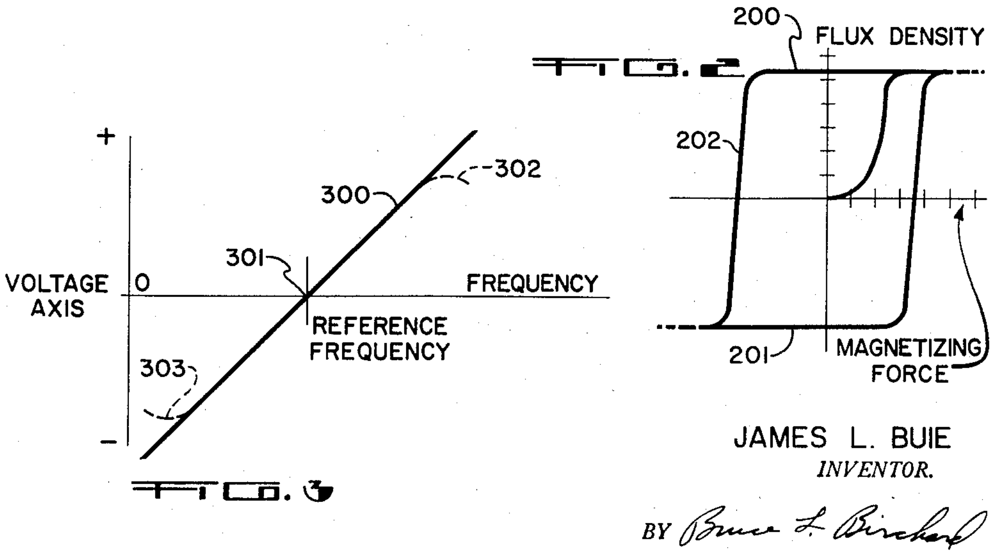
Figure 2 is a diagrammatic representation of the rectangular hysteresis loop exhibited by the core of the transformer employed in the circuit of Figure 1.
Figure 3 shows the frequency-voltage response curve of the discriminator according to this invention.

In Figure 1, input terminals 10 and 11 are provided for coupling to an input signal source (not shown). Input terminals 10 and 11 are coupled to the input circuit of a conventional limiter stage 12. Limiter stage 12 may be of any conventional type employing transistors, vacuum tubes, or diode clampers. The output circuit of limiter stage 12 is coupled to the primary winding of saturable transformer 13. Saturable transformer 13 has a core material exhibiting a rectangular hysteresis loop characteristic, as shown in Figure 2. The secondary winding of saturable transformer 13 is coupled to a full-wave rectifier stage 14. Rectifier stage 14 may employ a diode bridge circuit, or any other conventional full-wave rectifier circuit. To rectifier stage 14 is coupled a center-frequency adjustment in the form of potentiometer 15, which taps a bucking voltage from D.C. reference voltage source 16 for comparison with the output voltage from rectifier 14. The output circuit of rectifier stage 14 is coupled to the input side of low-pass filter 17, of conventional design. The output side of low-pass filter 17 is coupled to output terminals 18 and 19.

Figure 2 displays the rectangular hysteresis loop characteristic of the core of saturable transformer 13 in Figure 1. It is noted that portions 200 and 201 of curve 202 are extremely flat, indicating that once core saturation is achieved, flux density of such a core is independent, to all intent and purposes, of the magnetizing force applied. Further, the magnitude of this flux density during periods of saturation is a very nearly constant value.

The circuit of Figure 1 operates as follows. The input signal is fed through limiter stage 12 to transformer 13. While, theoretically, this limiter may be eliminated from the circuitry, yet from a practical standpoint it serves a useful purpose in limiting the noise level and in permitting an optimum core design for transformer 13 from the standpoint of maxim average output voltage and susceptibility of such output voltage to filtering.

The operation of transformer 13, owing to the property of its core material, deserves special consideration. Referring momentarily to Figure 2, as noted, the saturation flux level remains substantially constant despite further increases in the magnetizing force applied. It is recalled from Faraday's law that $$e_s = N_s \frac{d\phi_m}{dt} \times 10^{-8} \quad (1)$$

where $e_s$ is the voltage induced in the secondary winding, $N_s$ is the number of turns of the secondary winding, and $$\frac{d\phi_m}{dt}$$

is the time rate of change of mutual flux linkage existing between the primary and secondary windings. The differential $$\frac{d\phi_m}{dt}$$

is assumed to be proportional to $$\frac{d\phi_c}{dt}$$

where $\phi_c$ is is the total flux present in the transformer core at any particular time $t$.

Then, from Equation 1

$$\int e_s dt = N_s \phi_m \times 10^{-8} \quad (2)$$

since, to all intent and purposes, $\phi_m$ is of constant magnitude and independent of time $t$. In Figure 2 it is seen that the total change of flux during each half-cycle of induced voltage is equal to $2\phi_s$, where $\phi_s$ is the total mutual saturation flux during the period of time the transformer core operates in its saturated condition. Hence, $$\int_0^{T/2} e_s dt = 2N_s \phi_s \times 10^{-8} \quad (3)$$

where T is the period of the voltage impressed on the primary winding. But, the average votage for any waveshape during one-half cycle is $$E_{av} = \frac{2}{T} \int_0^{T/2} e_s dt \quad (4)$$

Therefore, from Equations 3 and 4

(5) $$E_{av}=\frac{4N_s\phi_s\times10^{-8}}{T}$$

and as $$f=\frac{1}{T}$$

where $f$ is the frequency, then (6) $$E_{ar}=4fN_s\phi_s\times10^{-8}$$

It is seen from Equation 6 that the average induced voltage during any half cycle in the secondary of transformer 13 is directly proportional to the signal frequency.

Rectifier stage 14 operates to commutate the output voltage from the secondary winding of transformer 13. A full-wave rectifier is employed since it is important to keep D.C. current out of the secondary winding and thus preserve the rectangular hysteresis loop characteristic of the transformer core.

Direct current reference voltage source 16 provides a bucking voltage to balance out the rectifier output average when the discriminator is operating at the reference frequency. This bucking voltage may be adjusted for any desired discriminator reference frequency by means of potentiometer 15. Deviation of the input signal from the reference frequency results in unbalance, once more, and the appearance of a unidirectional positive or negative voltage at the input to filter 17.

Low-pass filter 17, of conventional design, passes only the very low-frequency variations in D.C. output voltage.

Figure 3 demonstrates the wide response curve of a discriminator embodying the present invention. Response curve 300 will extend linearly from reference frequency point 301 into both the upper and lower response regions. Conventional discriminator response curves would be much narrower, tending to round off in curve portions 302 and 303.

It is seen that this invention provides a new and useful discriminator design. The linear response curve of such a discriminator is limited only by the response of the transformer core as the operating frequency is increased. Present transformer materials permit a maximum frequency of operation of ten-thousand cycles before the hysteresis loop of the core becomes distorted. Materials presently being tested show promise of increasing this upper frequency limit.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

A wide band discriminator selectively responsive to a signal reference frequency and deviations therefrom, including means for amplitude limiting an input signal, saturable transformer means having a core material exhibiting a rectangular hysteresis loop, said transformer means being responsive to the output signal from said limiting means for producing a time integrated signal the average half-cycle voltage of which is dependent in magnitude solely upon the frequency of the input signal, means responsive to the output signal from said integrating means for commutating said signal to produce a pulsating D.C. signal, means coupled to said commutating means for providing a controllable bucking voltage which may be adjusted to balance out, at the signal reference frequency, the average voltage of said commutated signal, and low-pass filter means for filtering said output signal to provide an averaged direct-current output voltage dependent in magnitude and polarity substantially only upon the frequency of the discriminator input signal.

References Cited in the file of this patent

UNITED STATES PATENTS

| | | |
|---|---|---|
| 2,054,676 | La Pierre | Sept. 15, 1936 |
| 2,145,561 | Toth et al. | Jan. 31, 1939 |
| 2,286,413 | Herold et al. | June 16, 1942 |
| 2,441,957 | De Rosa | May 25, 1948 |
| 2,695,384 | Stuart | Nov. 23, 1954 |
| 2,704,842 | Goodell et al. | Mar. 22, 1955 |
| 2,713,677 | Scott et al. | July 19, 1955 |
| 2,720,584 | Sloughter | Oct. 11, 1955 |
| 2,756,376 | Davis et al. | July 24, 1956 |